2,860,109
Patented Nov. 11, 1958

2,860,109

CROSS-LINKED ACRYLIC ANHYDRIDE TERPOLYMER CATION EXCHANGER

Gerhard Abel, deceased, late of Darmstadt, Germany, by Margarete Abel, widow and heir and guardian or trustee of minor heirs, Darmstadt, and Adolf Wohnhas, Weiterstadt, Germany, assignors to Rohm & Haas G. m. b. H., Darmstadt, Germany No Drawing. Application September 12, 1955
Serial No. 544,578

Claims priority, application Germany September 13, 1954

3 Claims. (Cl. 260—2.2)

This invention relates to novel resins and to a method for preparing them. The resins of the invention are useful particularly as ion exchange resins of the carboxylic type.

It is known that a considerable variety of cross-linked polymers containing carboxylic groups have heretofore been proposed for use as cation exchangers. Basically, the requirements of such resins include minimum solubility, flow resistance and swelling combined with maximum ionic capacity, susceptibility to ionic diffusion, resin particle strength, and abrasion resistance. Generally, an increase in the number of exchange groups to increase the ionic capacity will also result in undesirable increases in solubility and tendency to swell. Furthermore, measures to reduce solubility ordinarily result in reducing the permeability and therefore the rate of ionic diffusion.

Resins heretofore prepared by copolymerization of one or several monovinyl compounds with a suitable cross-linking agent, generally an olefinic compound that is bifunctional in the sense that it contains two olefinic groups in the molecule, e. g., divinyl benzene, vinylmethacrylate, allylmethacrylate, glycol dimethacrylate, and the like, have left much to be desired as ion exchange resins. One disadvantage of such resins is that the individual resin particles are susceptible to the development of cracks when subjected to saponification. Such cracking is believed to be caused by the non-spherical shape of the resin particles and the slow rate at which the saponifying liquor penetrates them. Slow penetration causes the outer portions of the particle to swell at a time when the inner portions are unaffected, thus producing unbalanced internal stresses. The structural disintegration that inevitably follows represents a very considerable disadvantage because the fines resulting from the disintegration, if allowed to remain in a bed of resin particles, will increase the flow resistance and pressure drop to an extent sufficient to interfere seriously with the operation of the resin bed. The ultimate disadvantage of this is that the resin bed requires frequent replacement for the purpose of removing the fines and constitutes a considerable waste of resin.

We have now made the surprising discovery that resins suitable particularly for cation exchange can advantageously be prepared by copolymerizing a monomer that is capable of polymerizing to a substantially linear polymer with a cross-linking agent in the presence of an anhydride of a polymerizable monocarboxylic acid or a mixture of such anhydrides. The resins so prepared in accordance with the invention can readily be prepared in the form most desirable for ion exchange applications, i. e., in the form of substantially perfect spheres or spherical beads that are characterized by a high structural stability, insolubility, low pressure drop and superior exchange capacity. The resin may, if desired, be subjected to alkaline saponification in known manner for conversion into the form of an alkaline salt without adversely affecting the structural stability of the particles.

The resin of the invention is in essence a copolymer of at least three types of monomers. One of these types includes monomers that are capable of polymerizing to a substantially linear polymer. If one such monomer is employed, it would normally be one capable of forming a linear homopolymer. If two or more such monomers are employed, they are monomers capable of copolymerizing to a substantially linear copolymer. Monomers of this type which are preferred are the vinyl compounds containing a single olefinic group, such as acrylic acid, methacrylic acid, the esters of these acids such as methylacrylate, as well as such vinyl compounds as styrene, vinyl chloride and related compounds. Another of the monomer types is a cross-linking agent or polyfunctional compound containing at least two olefinic groups in the molecule. Divinyl benzene, vinylmethacrylate, allylmethacrylate, and glycol dimethacrylate are prominent among such polyfunctional compounds that are suitable for producing cross-linking and consequent insolubilization of the resin. The third monomer type essential in forming the improved resin of the invention is the anhydride of a polymerizable monocarboxylic acid, the anhydrides of acrylic acid and methacrylic acid being preferred. It is to be understood of course that mixtures of monomers of each of the three types may be used in accordance with the invention.

When it is desired to obtain the resin in the form of beads of substantially uniform size, it is advantageous to carry out the copolymerization by the well known suspension polymerization process, wheich involves suspending the monomers in an electrolyte containing, if desired, a suitable dispersing agent and a polymerization initiator or catalyst, and heating the suspension to the polymerization temperature, e. g., upwards of about 60 or 70° C. to as high as about 150 or 175° C., until there is formed a resin that is a fairly hard solid at room temperature.

The proportions of anhydride and cross-linking agent should both be significant from the point of favorably influencing the final characteristics of the copolymer, minimum proportions for these monomers being of the order of about 5%. On the other hand, they should not ordinarily total more than about 50%. Generally, we prefer to utilize amounts of anhydride monomer and cross-linking agent in the neighborhood of about 10% by weight.

The copolymers prepared in accordance with this invention have a number of important advantages over those prepared in accordance with previously suggested processes.

One of these advantages is that the resin can readily be produced, by suspension polymerization, in the form of beads whose substantially perfect spherical shape is retained during subsequent saponification. The beads have a desirably uniform and small particle size ranging between about 0.3 and 1.0 mm. in diameter. While we do not propose to be limited by any theory advanced, we believe that the ability of the polymer particles to retain their spherical shape during saponification may be explained by the fact that the internal stresses which normally lead to the occurrence of cracks or even disintegration of the physical structure are avoided or at least minimized. Such stresses counteract one another to a far greater extent in a sphere than in an irregular structure. Furthermore, the anhydride in the polymer promotes relatively rapid permeation of the bead-shaped particle by the saponifying medium because the anhydride bridges are rapidly split even before the completion of the saponification process. As a result, a swelling occurs which extends substantially uniformly throughout the entire particle.

Another advantage believed to be directly attributable to the use of anhydrides of polymerizable monocarboxylic acids in the preparation of the resin is that optimum exchange capacity is obtained without sacrificing insolubility. Still another advantage is that the substantially perfect spherical shape of the particles and their resistance to abrasion during saturation and elution reduces considerably the pressure drop through a bed of resin particles as well as the necessity for periodically removing fines produced by abrasion or internal cracking of the particles. Furthermore, the spherical shape of the particles permits changes in volume while charging and regenerating without incurring stresses that would tend to reduce their mechanical strength.

The utility and advantages of the invention will become further apparent from the following example illustrating the best mode now contemplated of practicing the invention.

Example

A mixture of 1125 parts by weight methylacrylate, 225 parts by weight of technical divinyl benzene (about 50% strength) and 150 parts by weight of methacrylic anhydride was subjected to suspension polymerization at a temperature of 75 to 80° C. in a 20% sodium chloride solution and in the presence of about 0.01 to 0.1% starch as dispersing agent and about 0.1 to 1% dibenzoyl peroxide as catalyst. The polymer thus obtained was in the form of spherical beads having diameters of from 0.3 to 1.0 mm. It was subjected to alkaline saponification and found to have a capacity of about 11.5 milliequivalents per gram of anhydrous substance.

The cation exchanger so prepared was used in removing temporary water hardness. The calcium oxide adsorption down to the breakthrough of the calcium hardness was about 50 to 60 grams CaO per liter of resin with a contact rate of 15 liters water per liter of resin per hour.

It is to be understood that numerous modifications will occur to those skilled in the art upon reading this description. All such modifications are intended to be included within the scope of the invention as defined in the appended claims.

We claim:

1. Process for preparing an ion exchange resin in the form of substantially spherical beads having diameters ranging between about 0.3 to 1.0 mm. which comprises heating to a temperature of the order of about 75 to 80° C., in a 20% sodium chloride solution and in the presence of about 0.01 to 0.1% starch and about 0.1 to 1% dibenzoyl peroxide, a mixture of about 80 parts by weight methylacrylate, 10 parts by weight divinylbenzene and 10 parts by weight methacrylic anhydride, and thereupon subjecting the terpolymer thus obtained to alkaline saponification.

2. A method of treating a liquid medium to remove cations therefrom which comprises contacting the liquid with an ion exchange resin in the form of substantially spherical beads having diameters ranging between about 0.3 and 1.0 mm., said resin being a terpolymer prepared by heating to a temperature of the order of about 75 to 80° C. in an aqueous electrolyte and in the presence of an oxidizing catalyst and a dispersing agent, a mixture of a monovinyl monomer selected from the group consisting of acrylic acid, methacrylic acid, the lower alkyl esters thereof, styrene and vinyl chloride, a divinyl monomer selected from the group consisting of divinylbenzene, vinyl methacrylate, allyl methacrylate and glycol dimethacrylate, and an anhydride selected from the group consisting of acrylic acid anhydride and methacrylic acid anhydride, the proportions of said divinyl monomer and anhydride being between 5 and 50% by weight of total monomer.

3. A method of treating water to remove cations therefrom which comprises contacting the water with a terpolymer of methylacrylate, divinylbenzene and methacrylic anhydride in relative proportions of approximately 80:10:10, said terpolymer being in the form of substantially spherical beads having diameters ranging between about 0.3 and 1.0 mm.

References Cited in the file of this patent

UNITED STATES PATENTS

| | | |
|---|---|---|
| 2,278,637 | Barnes | Apr. 7, 1942 |
| 2,321,728 | Barnes | June 15, 1943 |
| 2,401,445 | White | June 4, 1946 |
| 2,471,818 | Hunter et al. | May 31, 1949 |
| 2,687,408 | Grim | Aug. 24, 1954 |
| 2,731,408 | Clarke | Jan. 17, 1956 |
| 2,764,518 | Thurmon | Sept. 25, 1956 |